(12) United States Patent
Chang et al.

(10) Patent No.: US 9,851,512 B2
(45) Date of Patent: Dec. 26, 2017

(54) OPTICAL FIBER CONNECTOR

(71) Applicants: Gloriole Electroptic Technology Corp., Kaohsiung (TW); Shen Zhen Wonderwin Technology Co., Ltd., Shenzhen, Guangdong Province (CN)

(72) Inventors: Ming-Hua Chang, Kaohsiung (TW); Yen-Chang Lee, Kaohsiung (TW)

(73) Assignees: GLORIOLE ELECTROPTIC TECHNOLOGY CORP., Kaohsiung (TW); SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 15/593,724

(22) Filed: May 12, 2017

(65) Prior Publication Data

US 2017/0329090 A1 Nov. 16, 2017

(30) Foreign Application Priority Data

May 16, 2016 (TW) .............................. 105207061 U
Sep. 23, 2016 (TW) .............................. 105214584 U
Jan. 9, 2017 (TW) .............................. 106200320 U (51) Int. Cl.
*G02B 6/36* (2006.01)
*G02B 6/38* (2006.01)

(52) U.S. Cl.
CPC ......... *G02B 6/3825* (2013.01); *G02B 6/3821* (2013.01); *G02B 6/3874* (2013.01); *G02B 6/3881* (2013.01); *G02B 6/3893* (2013.01)

(58) Field of Classification Search
CPC ... G02B 6/3831; G02B 6/3851; G02B 6/3881
See application file for complete search history.

(56) References Cited

U.S. PATENT DOCUMENTS

| | | | |
|---|---|---|---|
| 2005/0157987 A1* | 7/2005 | Dodds | G02B 6/3895 385/92 |
| 2016/0178856 A1* | 6/2016 | Chang | G02B 6/4246 385/92 |

* cited by examiner

*Primary Examiner* — Chris Chu
(74) *Attorney, Agent, or Firm* — Muncy, Geissler, Olds & Lowe, P.C.

(57) ABSTRACT

An optical fiber connector includes a main body unit having a guiding groove, and two position limiting portions that respectively protrude from two walls respectively defining two sides of the guiding groove toward each other, a sleeve unit, and a coupling unit including two coupling members each having two first protruding block portions that respectively protrude away from each other. The sleeve unit is configured to be movable rearwardly on the main body unit to press the first protruding block portions toward each other, so as to allow the first protruding block portions to pass past the position limiting portions, thereby allowing for movement of each of the coupling members between a non-working position and a working position.

8 Claims, 11 Drawing Sheets

OPTICAL FIBER CONNECTOR

CROSS-REFERENCE TO RELATED APPLICATION

This application claims priorities of Taiwanese Patent Application No. 105207061, filed on May 16, 2016, Taiwanese Patent Application No. 105214584, filed on Sep. 23, 2016, and Taiwanese Patent Application No. 106200320, filed on Jan. 9, 2017.

FIELD

The disclosure relates to an optical fiber connecting member, and more particularly to an optical fiber connector.

BACKGROUND

Multi-Fiber Push On optical fiber connector is an optical fiber connector configured for high-density optical-fiber networks. For current communication industry which requires large flow rate, disposition of high-density optical fibers in limited space is necessary. Therefore, the Multi-Fiber Push-On optical fiber connector becomes a common type of an optical fiber connector, and plays an important role in the high-density optical-fiber networks.

Figure 1:
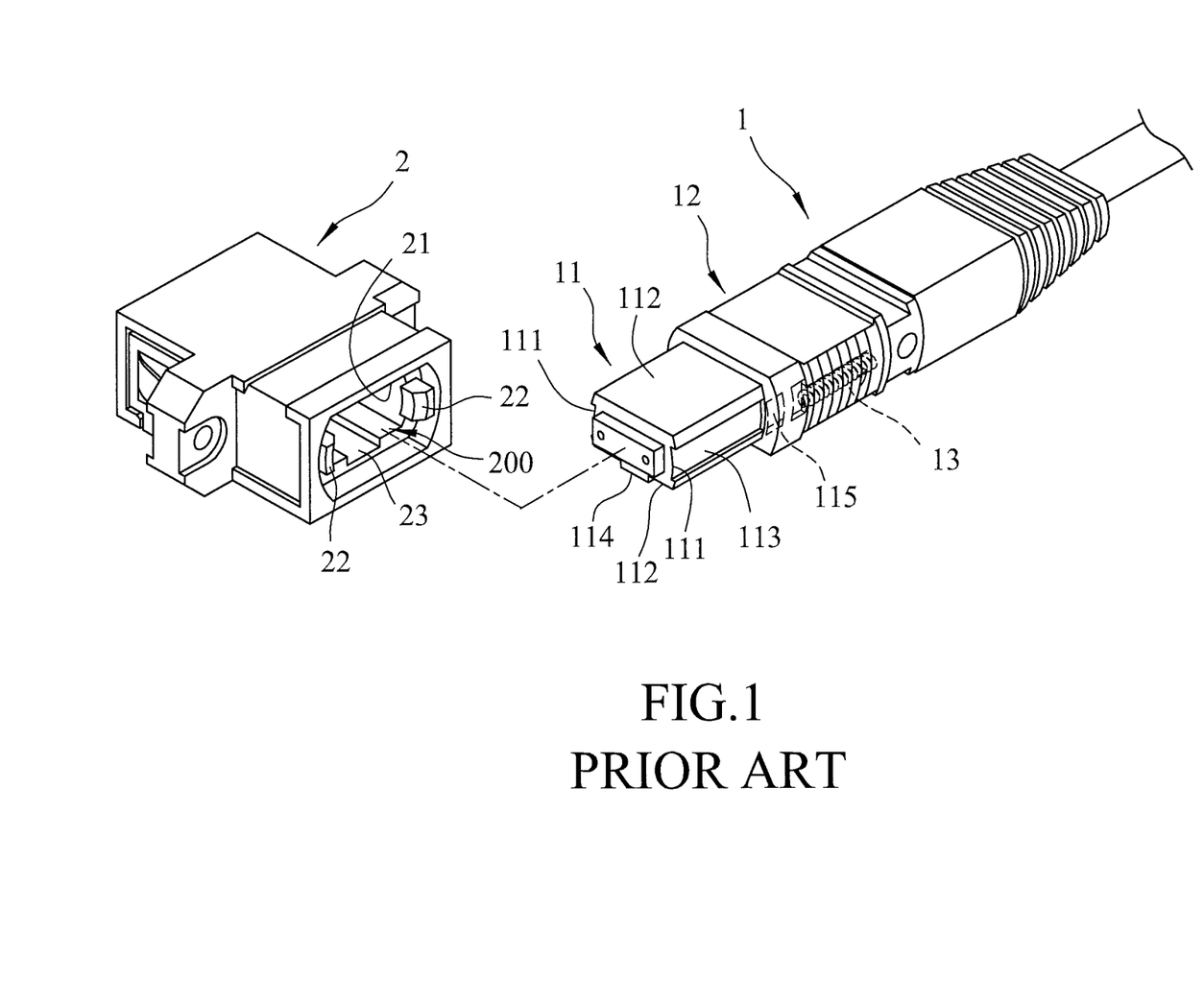
FIG. 1 is a perspective view of a conventional optical fiber connector and an adapter.
Figure 2:
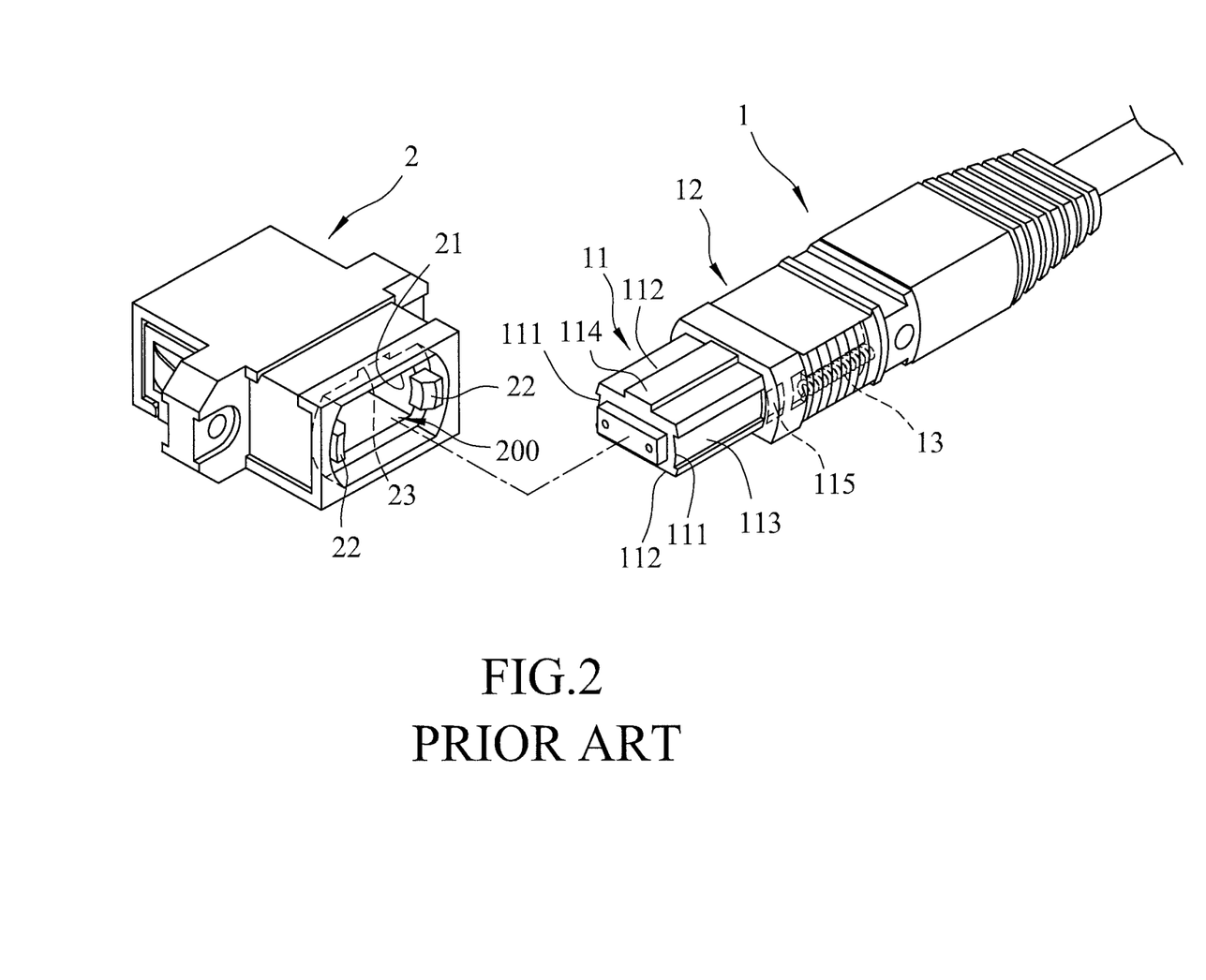
FIG. 2 is a perspective view of another type of the conventional optical fiber connector and another type of the adapter.

As shown in FIG. 1, a conventional optical fiber connector 1 is adapted to be connected to terminal equipment (not shown) which includes at least one adapter 2. The optical fiber connector 1 includes a main body 11 extending in a front-rear direction, a sleeve member 12 sleeved onto the main body 11, and two resilient members 13 (only one is visible) disposed between the main body 11 and the sleeve member 12, and disposed respectively at two opposite sides of the main body 11. The main body 11 has two side plates 111 spaced apart from each other, two connecting plates 112 connected between the side plates 111, two side grooves 113 (only one is visible) respectively formed in outer surfaces of the side plates 111, and extending in the front-rear direction, a coupling portion 114 extending in the front-rear direction, and connected to one of the connecting plates 112, and two retaining grooves 115 (only one is visible) respectively formed in the outer surfaces of the side plates 111, and respectively aligned with, spaced apart from and disposed behind the side grooves 113. The sleeve member 12 is movable by resilient forces provided by the resilient members 13 between a non-working position and a working position. When the sleeve member 12 is at the non-working position, the resilient members 13 are not compressed by the sleeve member 12, and the retaining grooves 115 are covered by the sleeve member 12. When the sleeve member is at the working position, the resilient members 13 are compressed by the sleeve member 12, and the retaining grooves 115 are not covered by the sleeve member 12.

The adapter 2 includes an inner surface 21 surrounding a connecting hole 200, two protrusions 22 protruding from the inner surface 21 toward each other, and a coupling groove 23 formed in one side of the inner surface 21. When it is desired to connect the conventional optical fiber connector 1 to the adapter 2, the main body 11 is inserted into the connecting hole 200, such that the coupling portion 114 of the main body 11 extends into the coupling groove 23. Hence, the protrusions 22 pass past the side grooves 113 of the main body 11 to push the sleeve member 12 from the non-working position toward the working position. At the working position, the protrusions 22 are respectively retained in the retaining grooves 115.

During such a connecting process, a user needs to endeavor to align the coupling groove 23 of the adapter 2 with the coupling portion 114 of the main body 11. Moreover, the manufacturing cost is increased in order to manufacture two different types (different specifications) of the conventional optical fiber connector 1.

SUMMARY

Therefore, the object of the disclosure is to provide an optical fiber connector that can be operated with ease and that has reduced manufacturing costs.

According to the disclosure, the optical fiber connector is adapted for connection with an adapter. The adapter is located in front of the optical fiber connector, and has an inner surrounding surface defining a connecting hole, and a coupling groove formed in the inner surrounding surface. The optical fiber connector includes a main body unit, a sleeve unit and a coupling unit. The main body unit extends in a front-rear direction, and includes two side plates spaced apart from each other, and two connecting plates connected between the side plates. Each of the connecting plates has a guiding groove extending in the front-rear direction, and two position limiting portions respectively protruding from two walls that respectively define two sides of the guiding groove toward each other in a transverse direction which is perpendicular to the front-rear direction. The sleeve unit is sleeved onto the main body unit, is movable relative to the main body unit in the front-rear direction, and has two connecting walls spaced apart from each other, and extending in the front-rear direction. Each of the connecting walls has an inner surface facing toward the main body unit, a slide groove formed in the inner surface, and communicated with a respective one of the guiding grooves of the main body unit, and two guiding block portions respectively protruding from two walls that respectively define two sides of the slide groove toward each other in the transverse direction. Each of the slide grooves cooperates with a corresponding one of the guiding grooves to form a slide space. The coupling unit includes two coupling members respectively movable in the slide spaces in the front-rear direction. Each of the coupling members has a base portion, two resilient arm portions spaced apart from each other in the transverse direction, and extending rearwardly from the base portion, and two first protruding block portions respectively protruding from the resilient arm portions in the transverse direction and away from each other. The base portion and the resilient arm portions are formed as one piece. Each of the coupling members is movable between a non-working position where the base portion of a corresponding one of the coupling members is concealed within the sleeve unit, and where the first protruding block portions are disposed behind the position limiting portions of the main body unit, and a working position where the first protruding block portions respectively abut against rear ends of the position limiting portions of the main body unit, and where at least a portion of the base portion of the corresponding one of the coupling members is exposed outwardly from the sleeve unit, and is adapted to engage the coupling groove of the adapter. The sleeve unit 4 is configured to be movable rearwardly on the main body unit to press the first protruding block portions of the coupling unit toward each other, so as to allow the first protruding block portions to pass past the position limiting portions of the main body unit, thereby allowing for movement of each of the coupling members between the non-working position and the working position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
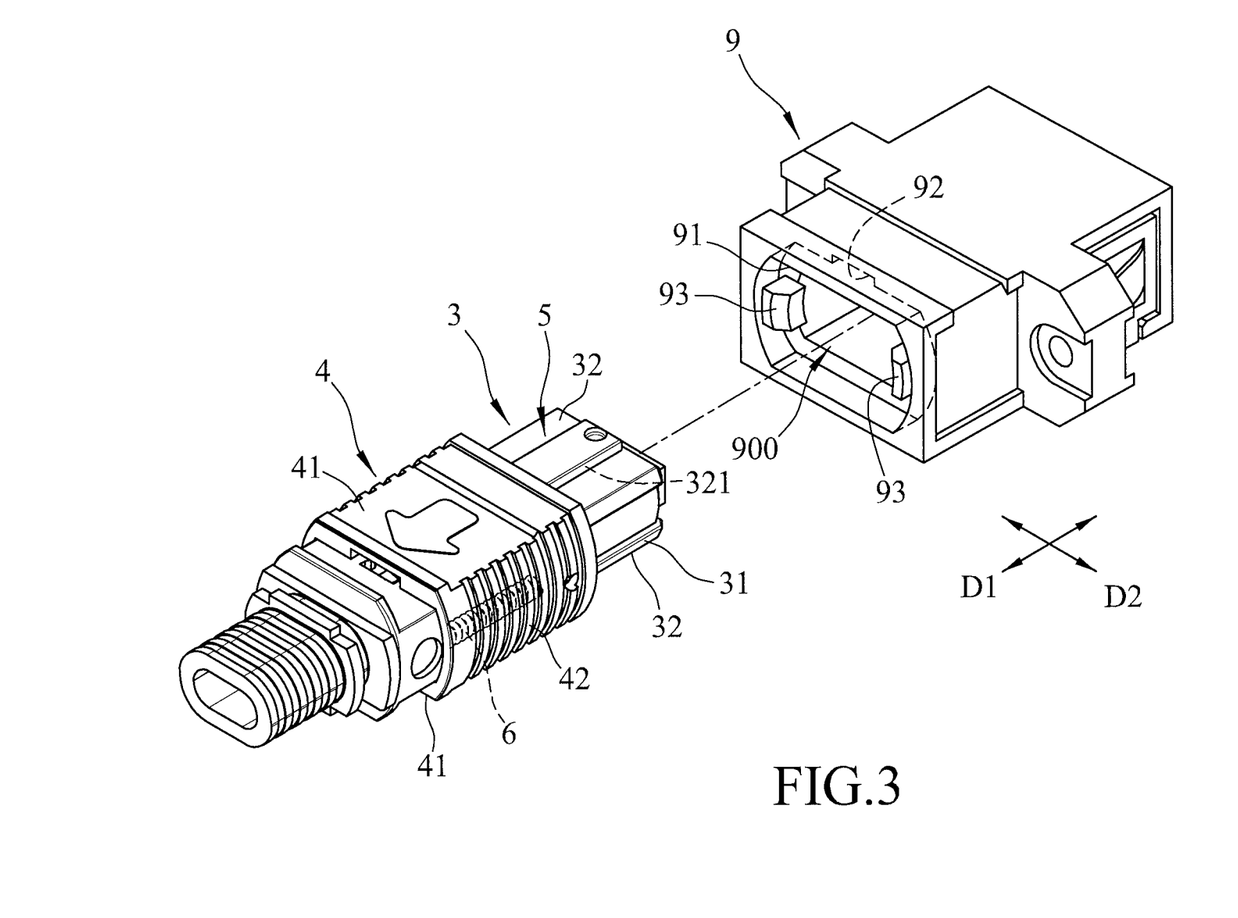
FIG. 3 is a perspective view of an embodiment of an optical fiber connector according to the disclosure and an adapter.

Referring to FIG. 3, the embodiment of an optical fiber connector according to the disclosure is adapted for connection with an adapter 9. The adapter 9 is located in front of the optical fiber connector, and has an inner surrounding surface 91 defining a connecting hole 900, a coupling groove 92 formed in the inner surrounding surface 91, and two locking blocks 93 protruding from the inner surrounding surface 91 toward each other. The optical fiber connector includes a main body unit 3 extending in a front-rear direction (D1), a sleeve unit 4 sleeved onto the main body unit 3, a coupling unit 5 disposed on the main body unit 3, and two resilient members 6 (only one is visible) spaced apart from each other, and disposed between the sleeve unit 4 and the main body unit 3.

Figure 4:
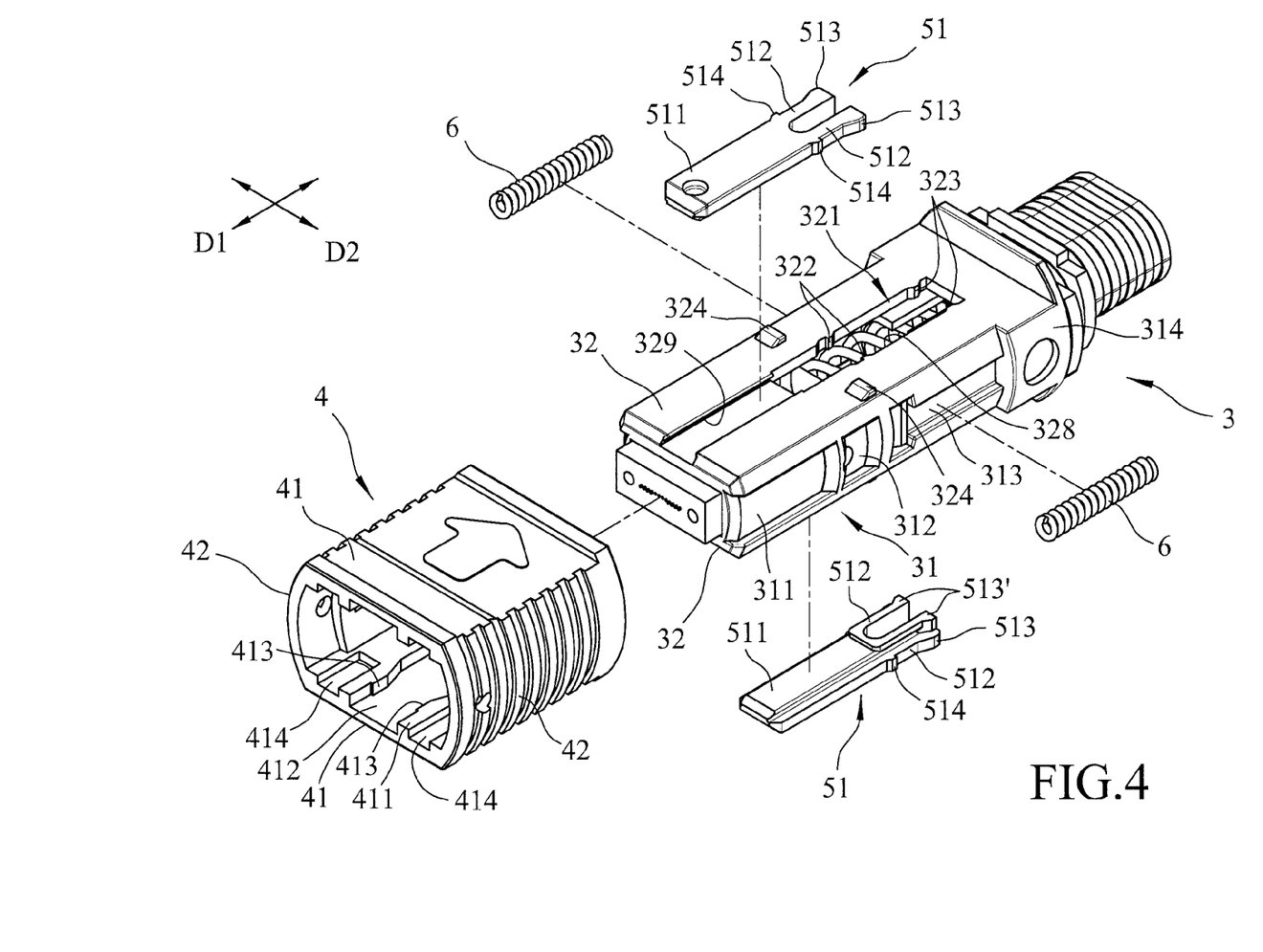
FIG. 4 is an exploded perspective view of the embodiment.
Figure 5:
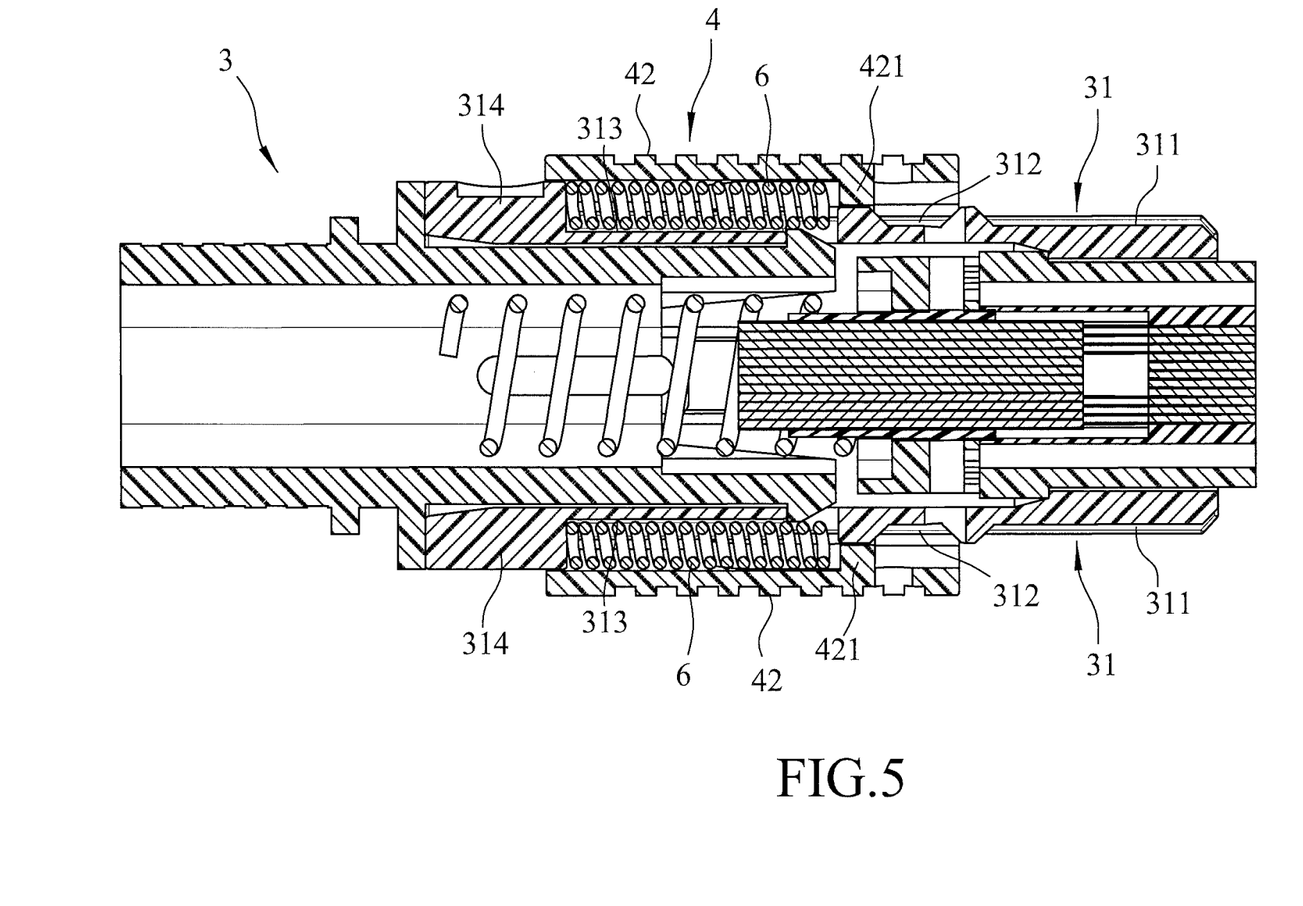
FIG. 5 is a sectional view of the embodiment.

Referring to FIGS. 4 and 5, the main body unit 3 includes two side plates 31 spaced apart from each other, and two connecting plates 32 connected between the side plates 31. Each of the connecting plates 32 has a guiding groove 321 extending in the front-rear direction (D1), two position limiting portions 322 respectively protruding from two walls which respectively define two sides of the guiding groove 321 toward each other in a transverse direction (D2) which is perpendicular to the front-rear direction (D1), two protruding portions 323 respectively protruding from the two walls which respectively define the two sides of the guiding groove 321 toward each other in the transverse direction (D2), and respectively located behind the position limiting portions 322, and two positioning blocks 324 respectively disposed at two opposite sides of the guiding groove 321.

Each of the guiding grooves 321 has a first section 328 extending through a corresponding one of the connecting plates 32, and a second section 329 communicated spatially with and located in front of the first section 328. The position limiting portions 322 and the protruding portions 323 of each of the connecting plates 32 are disposed in the first section 328.

Referring to FIGS. 3 to 5, each of the side plates 31 has a side groove 311 extending in the front-rear direction (D1), a retaining groove 312 aligned with, spaced apart from and disposed behind the side groove 311, a receiving groove 313 disposed behind the retaining groove 312, and a seat portion 314 disposed behind the receiving groove 313. The side grooves 311 are adapted for passage of the locking blocks 93 of the adapter 9, while the retaining grooves 312 are adapted to respectively retain the locking blocks 93 of the adapter 9 therein. The resilient members 6 are respectively disposed in the receiving grooves 313, and each of the resilient members 6 has two ends respectively abutting against a corresponding one of the seat portions 314 of the main body unit 3 and the sleeve unit 4.

The sleeve unit 4 is movable relative to the main body unit 3 in the front-rear direction (D1), and has two connecting walls 41 spaced apart from each other, and extending in the front-rear direction (D1), and two side walls 42 connected between the connecting walls 41. Each of the connecting walls 41 has an inner surface 411 facing toward the main body unit 3, a slide groove 412 formed in the inner surface 411, and communicated with a respective one of the guiding grooves 321 of the main body unit 3, two guiding block portions 413 respectively protruding from two walls which respectively define two sides of the slide groove 412 toward each other in the transverse direction (D2). Each of the side walls 42 has an inner protruding portion 421 protruding toward the main body unit 3. The two ends of each of the resilient members 6 respectively abut against the corresponding one of the seat portions 314 of the main body unit 3 and a corresponding one of the inner protruding portions 421 of the side walls 42 of the sleeve unit 4.

Each of the slide grooves 412 cooperates with a corresponding one of the guiding grooves 321 to form a slide space 500 (see FIGS. 6 to 9). The coupling unit 5 includes two coupling members 51 respectively movable in the slide spaces 500 in the front-rear direction (D1). Each of the coupling members 51 has a base portion 511, two resilient arm portions 512 spaced apart from each other in the transverse direction (D2), and extending rearwardly from the base portion 511, two first protruding block portions 513 respectively protruding from the resilient arm portions 512 in the transverse direction (D2) and away from each other, and two second protruding block portions 514 respectively protruding from the resilient arm portions 512 in the transverse direction (D2) and away from each other, and respectively located in front of the first protruding block portions 513. The base portion 511 and the resilient arm portions 512 are formed as one piece. Each of the coupling members 51 is movable between a non-working position where the base portion 511 of a corresponding one of the coupling members 51 is concealed within the sleeve unit 4, and where the first protruding block portions 513 are disposed behind the position limiting portions 322 of the main body unit 3, and a working position where the first protruding block portions 513 are disposed in front of the position limiting portions 322 of the main body unit 3, and where the base portion 511 of the corresponding one of the coupling members 51 is exposed outwardly from the sleeve unit 4, and is adapted to engage the coupling groove 92 of the adapter 9. The sleeve unit 4 is configured to be movable rearwardly on the main body unit 3 to press the first protruding block portions 513 toward each other, so as to allow the first protruding block portions 513 to pass past the position limiting portions 322 of the main body unit 3, thereby allowing for movement of each of the coupling members 51 between the non-working position and the working position. It should be noted that, in order to corresponding the first protruding block portions 513 of each of the coupling members 51 in size to the corresponding one of the slide grooves 412 and the corresponding one of the guiding grooves 321, a distance in the transverse direction (D2) between two portions (indicated as 513' in FIG. 4) of the first protruding block portions 513 which are disposed in the corresponding one of the guiding grooves 321 is shorter.

Figure 6:
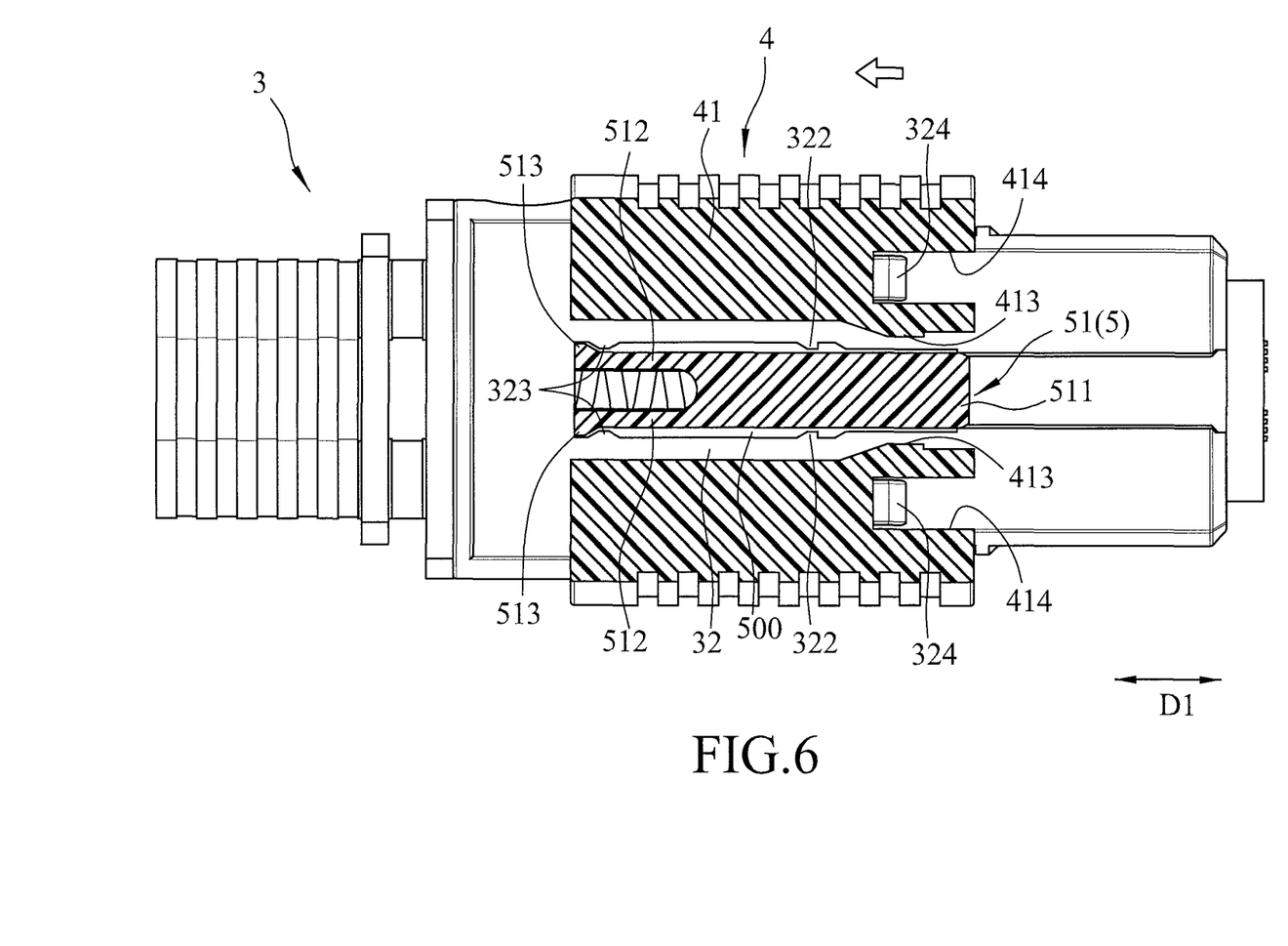
FIG. 6 is a schematic view of the embodiment when one of coupling members is at a non-working position.
Figure 7:
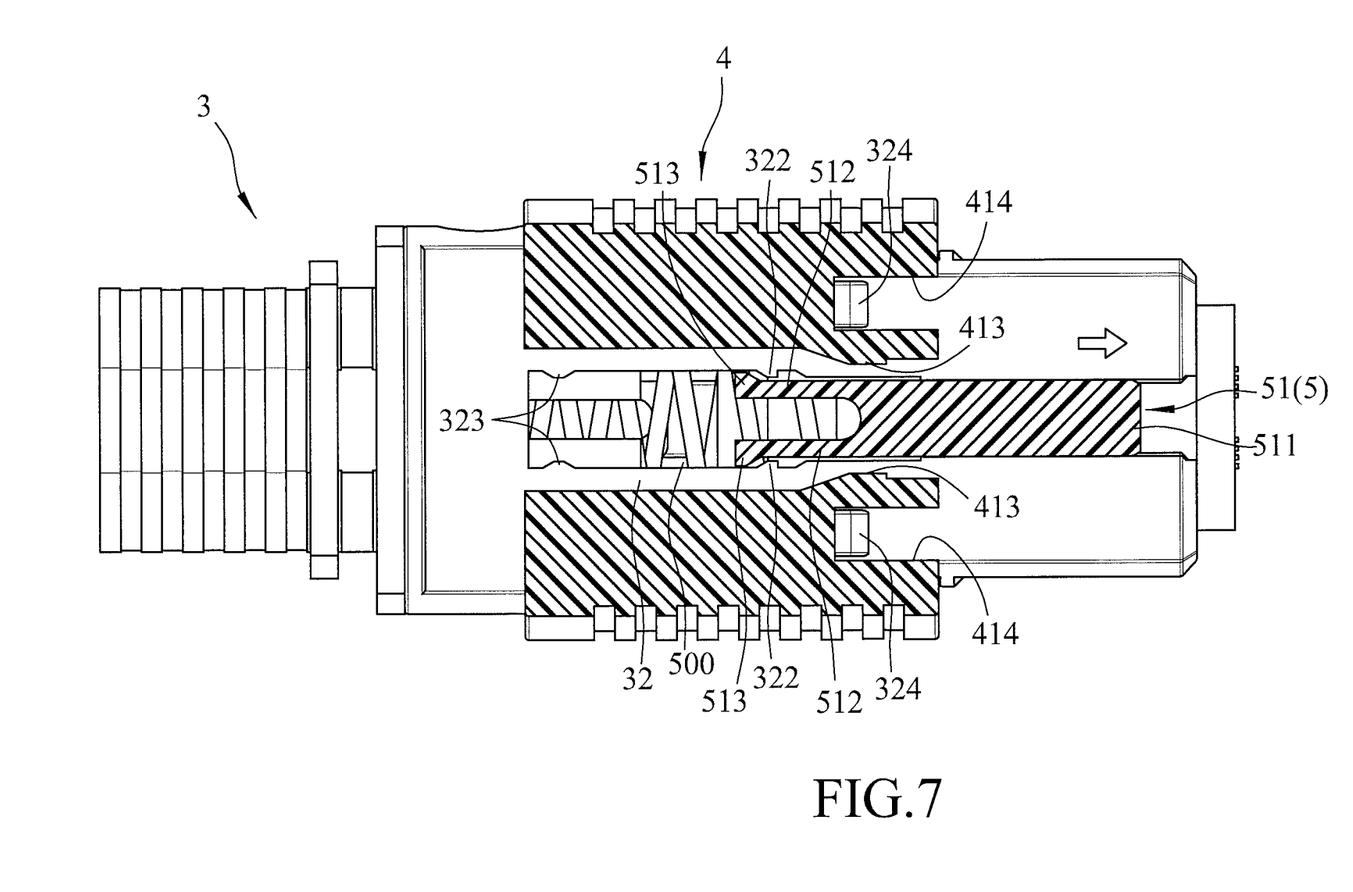
FIG. 7 is a schematic view of the embodiment illustrating that the one of the coupling members moves from the non-working position to a working position.
Figure 8:
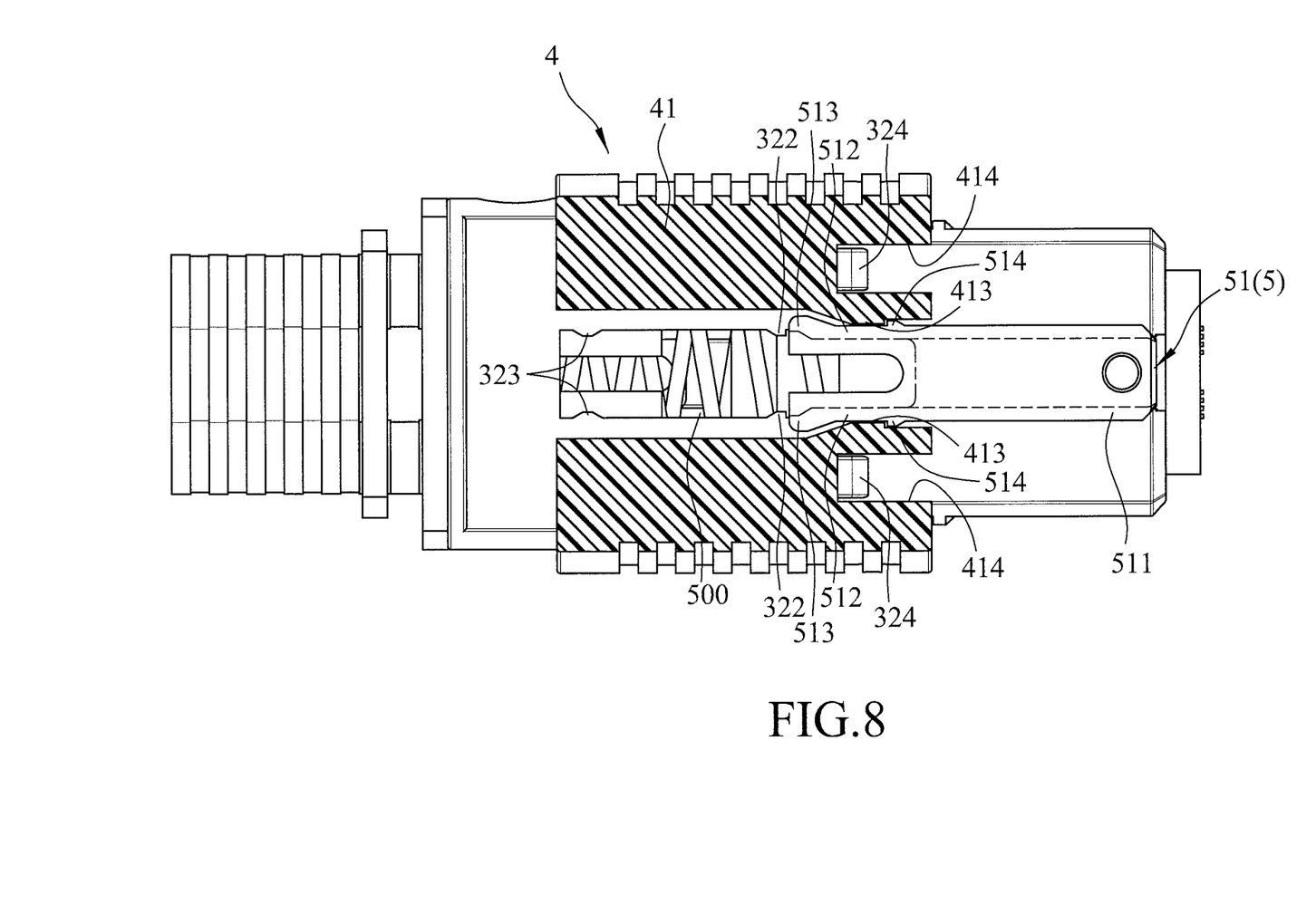
FIG. 8 is a schematic view of the embodiment when the one of the coupling member is at the working position.

Referring to FIGS. 6 to 8, only one coupling member 51, the corresponding one of the connecting plates 32 and the corresponding one of the connecting walls 41 will be described in the following for the sake of brevity. During operation, when the coupling member 51 is at the non-working position (shown in FIG. 6), the first protruding block portions 513 of the coupling member 51 are located behind the protruding portions 323 of the connecting plate 32. To move the coupling member 51 from the non-working position to the working position, the sleeve unit 4 is first moved rearwardly relative to the main body unit 3 in the front-rear direction (D1), so that, a portion of the coupling member 51 is exposed outwardly from the sleeve unit 4. The coupling member 51 is then moved forwardly in the front-rear direction (D1) in the slide space 500, and the first protruding block portions 513 pass past the protruding portions 323 and the position limiting portions 322 sequentially, as shown in FIGS. 7 and 8. When the coupling member 51 is at the working position, the guiding block portions 413 of the sleeve unit 4 abut against the resilient arm portions 512, and are located between and adjacent to the first protruding block portions 513 and the second protruding block portions 514. It should be noted that, when the first protruding block portions 513 respectively move on the position limiting portions 322, the resilient arm portions 512 are pressed to move toward each other, so that the first protruding block portions 513 can respectively pass past the position limiting portions 322.

It should be noted that, when a force is applied to move the sleeve unit 4 rearwardly on the main body unit 3, the resilient members 6 are compressed so that, upon release of the force, each of the resilient members 6 applies a resilient force to move the sleeve unit 4 forwardly on the main body unit 3, and the resilient members 6 bias the positioning blocks 324 toward rear ends of the positioning grooves 414. Therefore, after the coupling member 51 is operated, an additional force is not required to apply to move the sleeve unit 4 forwardly. In addition, when the sleeve unit 4 moves relative to the main body unit 3, the positioning blocks 324 respectively move in the positioning grooves 414. As such, the travel distance of the sleeve unit 4 relative to the main body unit 3 is limited by the positioning grooves 414 and the positioning blocks 324.

Figure 9:
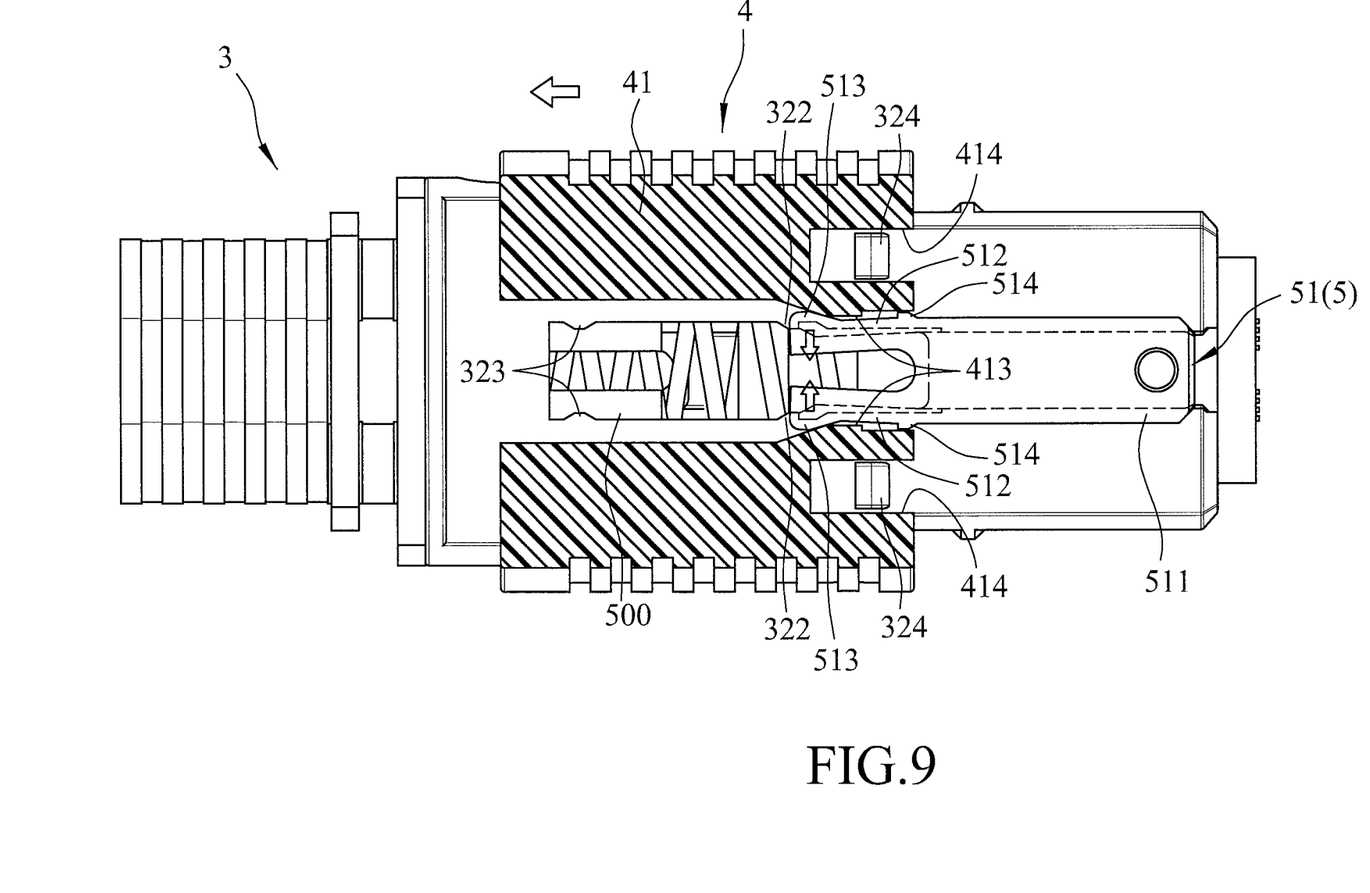
FIG. 9 is a schematic view of the embodiment illustrating that the one of the coupling member moves from the working position to the non-working position.

Referring to FIGS. 8 and 9, to move the coupling member 51 from the working position back to the non-working position, the sleeve unit 4 is also required to be moved rearwardly. In such manner, the guiding block portions 413 respectively press the first protruding block portions 513 to move the resilient arm portions 512 toward each other, and the second protruding block portions 514 can thereby respectively passing past the guiding block portions 413. During further rearward movement of the coupling member 51, when the first protruding block portions 513 come into contact with the protruding portions 323, the resilient arm portions 512 is deformed, and the first protruding block portions 513 can thus respectively pass past the protruding portions 323.

Figure 10:
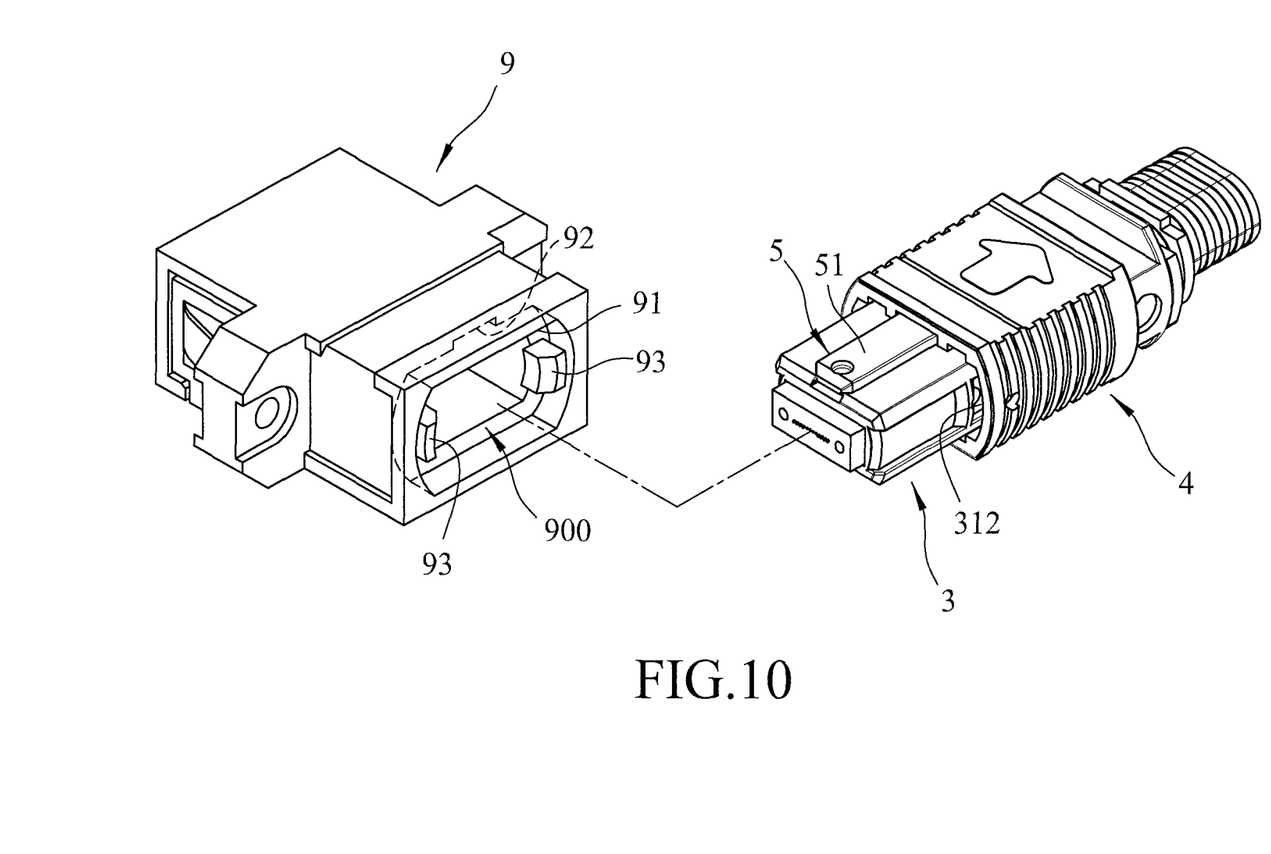
FIG. 10 is another perspective view of the embodiment and the adapter.

As shown in FIG. 10, the coupling members 51 of the coupling unit 5 may be adjusted based on the location of the coupling groove 92 of the adapter 9. That is, one of the coupling members 51 which is at the same side as the coupling groove 92 of the adapter 9 is adjusted to the working position, and the other one of the coupling members 51 remains at the non-working position. In such manner, the one of the coupling members 51 engages the coupling groove 92 when the optical fiber connector is connected to the adapter 9, and the locking blocks 93 are respectively retained in the retaining grooves 312.

Figure 11:
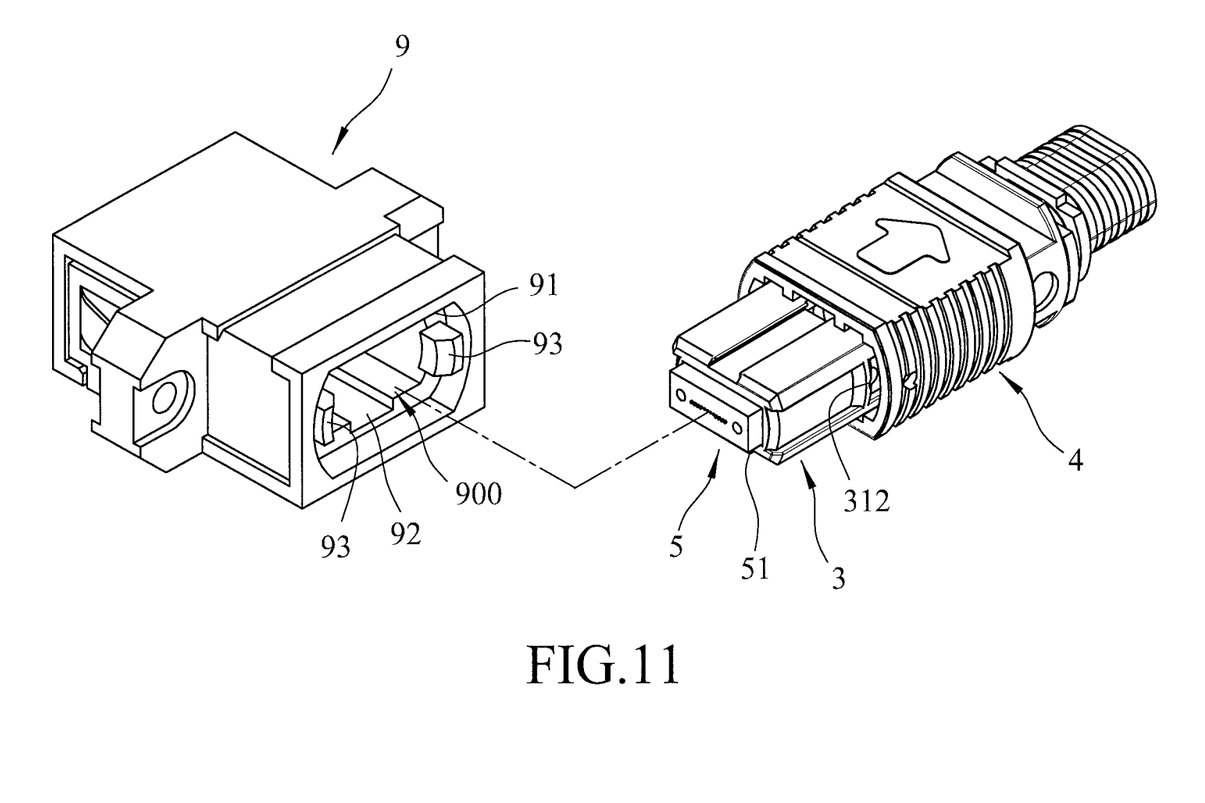
FIG. 11 is a perspective view of the embodiment and another type of the adapter.

As shown in FIG. 11, as the coupling groove 92 is disposed at the other side of the adapter 9 compared with the coupling groove 92 in FIG. 10, adjusting the other one of the coupling members 51 to the working position, and the one of the coupling members 51 to the non-working position, the optical fiber connector can still be connected to the adapter 9.

In conclusion, with the configuration of the optical fiber connector, the operating efficiency and the operating flexibility are increased.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector adapted for connection with an adapter, the adapter being located in front of said optical fiber connector, and having an inner surrounding surface that defines a connecting hole, and a coupling groove that is formed in the inner surrounding surface, said optical fiber connector comprising:
   a main body unit extending in a front-rear direction, and including two side plates that are spaced apart from each other, and two connecting plates that are connected between said side plates, each of said connecting plates having a guiding groove that extends in the front-rear direction, and two position limiting portions that respectively protrude from two walls respectively defining two sides of said guiding groove toward each other in a transverse direction which is perpendicular to the front-rear direction;
   a sleeve unit sleeved onto said main body unit, movable relative to said main body unit in the front-rear direction, and having two connecting walls that are spaced apart from each other, and that extend in the front-rear direction, each of said connecting walls having an inner surface that faces toward said main body unit, a slide groove that is formed in said inner surface, and that is communicated with a respective one of said guiding grooves of said main body unit, and two guiding block portions that respectively protrude from two walls respectively defining two sides of said slide groove toward each other in the transverse direction, each of said slide grooves cooperating with a corresponding one of said guiding grooves to form a slide space; and a coupling unit including two coupling members that are respectively movable in said slide spaces in the front-rear direction, each of said coupling members having a base portion, two resilient arm portions that are spaced apart from each other in the transverse direction, and that extend rearwardly from said base portion, and two first protruding block portions that respectively protrude from said resilient arm portions in the transverse direction and away from each other, said base portion and said resilient arm portions being formed as one piece, each of said coupling members being movable between a non-working position where said base portion of a corresponding one of said coupling members is concealed within said sleeve unit, and where said first protruding block portions are disposed behind said position limiting portions of said main body unit, and a working position where said first protruding block portions are disposed in front of said position limiting portions of said main body unit, and where at least a portion of said base portion of the corresponding one of said coupling members is exposed outwardly from said sleeve unit, and is adapted to engage the coupling groove of the adapter;

wherein said sleeve unit is configured to be movable rearwardly on said main body unit to press said first protruding block portions of each of said coupling members of said coupling unit toward each other, so as to allow said first protruding block portions to pass past said position limiting portions of said main body unit, thereby allowing for movement of each of said coupling members between the non-working position and the working position.

2. The optical fiber connector as claimed in claim 1, wherein each of said coupling members further has two second protruding block portions respectively protruding from said resilient arm portions in the transverse direction and away from each other, and respectively located in front of said first protruding block portions such that, when each of said coupling members is at the working position, said guiding block portions of said sleeve unit respectively abut against said resilient arm portions, and are confined between adjacent to said first protruding block portions and said second protruding block portions.

3. The optical fiber connector as claimed in claim 1, the adapter further having two locking blocks that protrude from the inner surrounding surface toward each other, wherein:
each of said side plates of said main body unit has a side groove extending in the front-rear direction, and a retaining groove aligned with, spaced apart from and disposed behind said side groove; and
said side grooves are adapted for passage of the locking blocks of the adapter, while said retaining grooves are adapted to respectively retain the locking blocks of the adapter therein.

4. The optical fiber connector as claimed in claim 3, wherein:
each of said side plates of said main body unit further has a receiving groove disposed behind said retaining groove, and a seat portion disposed behind said receiving groove;
said optical fiber connector further comprises two resilient members respectively disposed in said receiving grooves;
each of said resilient members has two ends respectively abutting against a corresponding one of said seat portions of said main body unit and said sleeve unit; and
when a force is applied to move said sleeve unit rearwardly on said main body unit, said resilient members are compressed so that, upon release of the force, each of said resilient members applies a resilient force to move said sleeve unit forwardly on said main body unit.

5. The optical fiber connector as claimed in claim 4, wherein:
said sleeve unit further has two side walls connected between said connecting walls, and each of said side walls has an inner protruding portion protruding toward said main body unit;
said two ends of each of said resilient members respectively abut against the corresponding one of said seat portions of said main body unit and a corresponding one of said inner protruding portions of said side walls of said sleeve unit.

6. The optical fiber connector as claimed in claim 1, wherein:
each of said connecting plates of said main body unit further has two positioning blocks respectively disposed at two opposite sides of said guiding groove;
each of said connecting walls of said sleeve unit further has two positioning grooves respectively disposed at two opposite sides of said slide groove; and
when said sleeve unit moves relative to said main body unit, said positioning blocks respectively move in said positioning grooves, and said resilient members bias said positioning blocks toward rear ends of said positioning grooves.

7. The optical fiber connector as claimed in claim 1, wherein each of said connecting plates of said main body unit further has two protruding portions respectively protruding from the two walls respectively defining the two sides of said guiding groove toward each other in the transverse direction, and respectively located behind said position limiting portions such that, when a corresponding one of said coupling members is at the non-working position, said first protruding block portions of the corresponding one of said coupling members are respectively located behind and adjacent to said protruding portions.

8. The optical fiber connector as claimed in claim 7, wherein:
each of said guiding grooves has a first section extending through a corresponding one of said connecting plates, and a second section communicated spatially with and located in front of said first section; and
said position limiting portions and said protruding portions of each of said connecting plates are disposed in said first section.

* * * * *